(12) United States Patent
Uhlenbusch (10) Patent No.: US 9,759,439 B2
(45) Date of Patent: Sep. 12, 2017

(54) SOUND-ABSORBENT ELEMENT FOR AN AIR OUTLET

(71) Applicant: DR. SCHNEIDER KUNSTSTOFFWERKE GMBH, Kronach (DE)

(72) Inventor: Olaf Uhlenbusch, Marktzeuln (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 0 days.

(21) Appl. No.: 15/103,823

(22) PCT Filed: Dec. 2, 2014

(86) PCT No.: PCT/EP2014/076159
§ 371 (c)(1),
(2) Date: Jun. 10, 2016

(87) PCT Pub. No.: WO2015/086366
PCT Pub. Date: Jun. 18, 2015

(65) Prior Publication Data
US 2016/0313015 A1 Oct. 27, 2016

(30) Foreign Application Priority Data
Dec. 11, 2013 (DE) .................. 20 2013 105 639 U (51) Int. Cl.
*E04F 17/04* (2006.01)
*F24F 3/16* (2006.01)
(Continued)

(52) U.S. Cl.
CPC ........ *F24F 3/1603* (2013.01); *B01D 53/0407* (2013.01); *B60H 1/00664* (2013.01);
(Continued)

(58) Field of Classification Search
CPC .......... F24F 3/1603; F24F 13/08; F24F 13/24; B01D 53/0407; B01D 2253/102;
(Continued)

(56) References Cited

U.S. PATENT DOCUMENTS 4,330,047 A * 5/1982 Ruspa .................... F24F 13/08
181/224
5,728,979 A * 3/1998 Yazici ...................... F24F 7/08
181/224
(Continued)

FOREIGN PATENT DOCUMENTS

DE  1034396   7/1958   ............. G01N 11/10
DE  9100514   6/1992   ............... B60H 1/34
(Continued)

OTHER PUBLICATIONS

International Search Report issued in corresponding application No. PCT/EP2014/076159 dated Apr. 28, 2015 (3 pgs).
(Continued)

*Primary Examiner* — Forrest M Phillips
(74) *Attorney, Agent, or Firm* — Hayes Soloway P.C.

(57) ABSTRACT

The invention relates to a sound-absorbent element for an air outlet, said air outlet comprising a housing with an air outlet opening and a connection to an air supply shaft, at least one sound-absorbent element being mounted in said housing and/or a housing of the air supply shaft, and said sound-absorbent element comprising a carrier that is connected to at least one layer of sound-absorbent material. Said at least one layer of sound-absorbent material comprises activated carbon, or at least one additional layer of activated carbon is applied to this layer of sound-absorbent material.

20 Claims, 4 Drawing Sheets

(51) Int. Cl.
*B60H 1/34* (2006.01)
*G10K 11/168* (2006.01)
*B01D 53/04* (2006.01)
*B60H 3/06* (2006.01)
*F24F 13/08* (2006.01)
*F24F 13/24* (2006.01)
*B60H 1/00* (2006.01)

(52) U.S. Cl.
CPC .............. *B60H 1/34* (2013.01); *B60H 3/0608* (2013.01); *F24F 13/08* (2013.01); *F24F 13/24* (2013.01); *G10K 11/168* (2013.01); *B01D 2253/102* (2013.01); *B01D 2259/4566* (2013.01); *B60H 2001/006* (2013.01); *B60H 2003/0691* (2013.01); *F24F 2003/1625* (2013.01); *F24F 2013/242* (2013.01)

(58) Field of Classification Search
CPC ........ B01D 2259/4566; B60H 1/00664; B60H 3/0608; B01H 1/34; G10K 11/168
USPC ........................................ 181/224, 225, 229
See application file for complete search history.

(56) References Cited

U.S. PATENT DOCUMENTS

| | | | | |
|---|---|---|---|---|
| 5,728,980 A * | 3/1998 | Zarnick | ................... | E04F 17/04 181/224 |
| 6,668,970 B1 * | 12/2003 | Lee | ......................... | E04F 17/04 181/224 |
| 6,971,474 B2 * | 12/2005 | Prosser | .............. | B60H 1/00564 181/198 |
| 7,098,423 B2 | 8/2006 | Masuda et al. | .......... | 219/121.82 |
| 7,802,651 B2 * | 9/2010 | Park | ....................... | B01D 46/10 181/224 |
| 8,146,706 B2 * | 4/2012 | Katoh | ................ | B60H 1/00564 138/115 |
| 8,678,131 B2 * | 3/2014 | Wiegers | .................. | F01N 13/18 181/224 |
| 2009/0178879 A1 * | 7/2009 | Park | ....................... | B01D 46/10 181/224 |
| 2009/0200103 A1 * | 8/2009 | Potschka | ................... | F15D 1/04 181/224 |

FOREIGN PATENT DOCUMENTS

| | | | | |
|---|---|---|---|---|
| DE | 69400122 | 9/1996 | ............... | B60H 3/06 |
| DE | 4244906 | 2/1998 | ............. | F04D 29/66 |
| DE | 19705629 | 8/1998 | ............... | B60H 1/00 |
| DE | 20016255 | 4/2001 | ............. | G10K 11/16 |
| DE | 10047068 | 4/2002 | ............... | B60H 3/06 |
| DE | 10261081 | 2/2004 | ............... | B60H 1/00 |
| DE | 102005025556 | 12/2005 | ............. | B23K 26/04 |
| DE | 202006006409 | 8/2006 | ............... | B60H 1/34 |
| EP | 0608034 | 7/1994 | ............... | B60H 3/06 |
| EP | 1826043 | 2/2007 | ............... | B60H 1/34 |

OTHER PUBLICATIONS

Translation of International Search Report issued in corresponding application No. PCT/EP2014/076159 dated Apr. 28, 2015, dated Jun. 18, 2015 (2 pgs).

International Preliminary Report on Patentability Ch. 2 issued in corresponding application No. PCT/EP2014/076159 dated Mar. 24, 2016 (6 pgs).

Translation of the International Preliminary Report on Patentability issued in corresponding application No. PCT/EP2014/076159, dated Jul. 5, 2016 (6 pgs).

Written Opinion of the International Search Authority issued in corresponding application No. PCT/EP2014/076159, dated Jun. 18, 2015 (5 pgs).

Written Opinion of the International Search Authority issued in corresponding application No. PCT/EP2014/076159, dated Nov. 26, 2015 (5 pgs).

* cited by examiner

SOUND-ABSORBENT ELEMENT FOR AN AIR OUTLET

BACKGROUND OF THE INVENTION

The present invention relates to a sound-absorbing element for an air vent, wherein the air vent comprises a housing with an air outlet opening and a connection to an air supply shaft, wherein at least one sound-absorbing element is mounted in the housing and/or a housing of the air supply shaft and wherein the sound-absorbing element comprises a support connected with at least one layer of sound-absorbing material.

A range of measures and devices for reducing noise in air vents is known from the prior art. Thin and easily movable parts are frequently mounted in such air vents, which parts are set into oscillation by the exiting air flow and therefore create disturbing noise. Particularly in the case of a motor vehicle, such disturbing noises also arise as a consequence of vibration of parts of the vehicle or in the event of travel on, for example, uneven ground, which equally leads to undesired vibration or movement of the thin components of an air vent. On the other hand, flow noise also arises due to the fact that air guide elements represent resistance to the air flow, particularly when they are in extreme settings (for example, vertical slats at 45° to the flow direction so as to deflect outflowing air).

Thus, horizontal slats, vertical slats or closure flaps are known from, for example, EP 1 826 043 B1, which have a straight front or back edge going over into an area section which is three-dimensionally curved in wave shape.

Moreover, an air nozzle for guidance of an air flow from an air supply shaft is known from DE 20 2006 006 409 U1, wherein a closure flat, slats or inserts for deflecting exiting air flow is or are arranged in the housing of the air supply shaft and wherein the surfaces of the closure flap and/or the surfaces of the slats or inserts and/or the housing inner surfaces are at least partly coated with a layer of soft sound-absorbing material. The sound-absorbing materials can be foamed materials or textile materials.

It is possible to reduce disturbing noise by way of the constructions indicated in DE 20 2006 006 409 U1.

However, the layer of DE 20 2006 006 409 U1 does not produce an improvement in air quality. Complex filter devices are known for the purpose of, for example, improving the air quality of the air which is output from an air-conditioning installation of a motor vehicle. In these filter devices the air conducted into the passenger compartment is purified before output. For that purpose, these filter devices are, for example, arranged in the region of a glove box (DE 694 00 122 T2) or spaced further from a dashboard having air vents. These arrangements allow simple access to these filter devices. However, the air covers a lengthy path from these filter devices to the air outlet opening of an air vent. In addition, these filter devices need a not insignificant installation space.

DE 102 61 081 B3 discloses an air guide element, particularly an air guide channel for a motor vehicle, with a reverberative channel body which is produced from plastics material and which has at least one wall region replaced by a sound-absorbing component, wherein the sound-absorbing component has an at least partly exposed outer side. The plastics material of the channel body is injection-moulded around an edge region of the sound-absorbing component in such a way that the sound-absorbing component is mechanically positively connected at least in sections along its circumference with the channel body.

DE 103 43 96 A1 discloses a flap, particularly for an air channel of a motor vehicle ventilating system, by which the air flow in the air channel is regulated, for which purpose the flap can adopt different settings in the air channel, wherein the flap has an air-permeable region and an air-impermeable region.

DE 197 05 629 A1 discloses a device for reducing the noises emanating from components of a heating or air-conditioning installation for motor vehicles and transmitted into the passenger compartment, with an air flap furnished with sound-damping material, wherein the air flap is an auxiliary flap arranged within the air circulation channel and the auxiliary flap substantially consists of air-permeable material.

DE 91 00 514 U1 discloses an air guide element, particularly ventilation nozzle for a motor vehicle, with a shape-stable, reverberative plastics-material channel body preferably of polypropylene, wherein a wall region of the channel body is partially replaced by a non-reverberative insulating part and the non-reverberative insulating part consists of melamine-resin foamed material.

DE 42 44 906 C2 discloses a fan for a motor vehicle air-conditioning installation. The fan comprises a fan-wheel housing and a sound-absorbing element. The sound-absorbing element is arranged in the fan-wheel housing so as to divide the interior thereof into a first chamber and a second chamber. The first chamber has an air inlet and an air outlet and receives a fan wheel. The second chamber receives a motor, which is so connected with the fan wheel that the fan wheel is driven by the motor to allow air to flow through the first chamber. The fan-wheel housing is provided with a motor cooling air channel formed integrally with the fan-wheel housing. In addition, the motor cooling air channel extends between the first chamber and the second chamber via the sound-absorbing element so as to introduce motor cooling air from the first chamber to the motor in the second chamber.

DE 100 47 068 A1 discloses a filter for removing constituents from an air flow, which is conducted in a channel, of a heating or air-conditioning installation of a motor vehicle. The filter consists of at least two filter layers having a mutual spacing in flow direction so that an intermediate space is formed between the filter layers. The spacing between the filter layers corresponds with approximately a quarter of a predetermined sound wave length. The filter is thus also acoustically active and contributes to sound damping.

A device for acoustic insulation is known from DE 200 16 255 U1. The device comprises a housing in which insulating material is arranged. The housing for its part is provided with air passage openings and the insulating material arranged in the housing consists, at least to 50%, of sheep virgin wool.

An air guide channel for ventilating, heating and/or air-conditioning a vehicle interior space is known from DE 10 2005 026 556 A1. The air guide channel has a channel wall which is made at least partly of a flexible material. The flexible material comprises a non-woven material and regions which enable a defined air output are formed in the channel wall.

The object of the present invention is therefore to reduce or suppress noise from an air vent and at the same time improve the quality of the output air.

SUMMARY OF THE INVENTION

In the case of a sound-absorbing element for an air vent, wherein the air vent comprises a housing with an air outlet opening and a connection to an air supply shaft, wherein at least one sound-absorbing element is mounted in the housing and/or a housing of the air supply shaft and wherein the sound-absorbing element comprises a support connected with at least one layer of sound-absorbing material, the at least one layer of sound-absorbing material comprises activated carbon or at least one further layer of activated carbon is applied to the layer of sound-absorbing material.

The additional introduction of activated carbon into the at least one layer or the application of at least one further layer of activated carbon produces on the one hand reduction in or suppression of noise caused by components of an air vent (slats, closure flap, air guide elements) and on the other hand purification of the air flowing out of the air vent. In particular, no additional installation space for filter devices is needed for this purpose and the air is purified in the region disposed directly in front of the passenger compartment.

In addition, the embodiment according to the invention is advantageous with respect to weight reduction, since not only does the sound-absorbing material (for example foamed material) have a lower weight than, for example, rubber lips which are known from the prior art and which are mounted on slats for avoidance of disturbing noise due to hitting against other parts, but also activated carbon has a lower density than conventional plastic materials for slats.

The at least one layer can in that regard be applied over an area to at least one side of the support. In this connection "area" signifies that the at least one layer substantially completely covers the side of the support or leaves free only a defined region (for example an encircling edge).

Moreover, a layer can be applied to both sides of the support.

Moreover, the support can have at least one seat in which the layer is so received that the layer is aligned with the region of the support surrounding the seat. This construction is suitable particularly for an embodiment in which the support is of two-dimensional construction.

The at least one layer can consist of foamed material, wherein activated carbon is introduced into the foamed material or the foamed material is coated with activated carbon. The activated carbon can be absorbed in different volume or weight proportions into the foamed material and be present in the foamed material in different forms. Alternatively, the foamed material can be coated over the whole area with the activated carbon. The coating with activated carbon can be carried out in different ways (for example gluing or mounting on the foamed material layer by means of a net or grid connected with the support).

The foamed material can, in further embodiments, be of open-pore construction. Open-pore foamed materials provide improved sound absorption and offer a larger surface. A larger surface can significantly improve purification of the air particularly through the activated carbon particles absorbed in the foamed material or through a coating with activated carbon.

In further forms of embodiment the at least one layer can also consist entirely of activated carbon. The activated carbon can in that regard similarly be attached to the support by way of a net or grid or otherwise be applied over the whole area to an areal support.

The support can have passages, openings or a support structure in the region of the layers. In that case, the weight of the sound-absorbing element is reduced. Advantageously, the outflowing air flows not only past the layer, for example, non-woven material, of sound-absorbing material with activated carbon, but additionally flows through this, as a result of which the cleaning action is further improved.

The sound-absorbing element can be a slat of an air vent, a closure flap of an air vent, an air guide element of an air supply shaft and/or at least a part of the housing of the air vent and/or of the air supply shaft.

The at least one layer can have an open-pore surface. In this embodiment not only the foamed material can be of open-pore construction, but also the at least one layer, which can consist solely of activated carbon or consist of activated carbon present in or at the sound-absorbing material.

The surface of the at least one layer can, in addition, have a regular or irregular surface structure. Surface structures additionally enlarge the surface, which has a positive effect particularly on noise reduction/absorption and air purification. For that purpose, propagation of soundwaves can be selectively prevented by specific surface structures. Regular and irregular structures comprise, inter alia, honeycombs, grooves, openings and elevations as well as further measures enlarging the surface.

The at least one layer can be thermally deformed. In particular, surface forms are created in correspondence with the field and purpose of use (for example, slat) when mounting on a frame-shaped support. Aerodynamically streamlined surfaces can thereby be created in simple mode and manner by the layers.

The at least one layer can be constructed in such a way that in air flow direction it has a greater thickness facing the air outlet opening than in the section facing the air supply shaft. A different thickness distribution of that kind produces an improved noise reduction or suppression and a defined air guidance.

Moreover, the further layer can be received in a support frame and the support frame connected with the support. A support frame can be, for example, reticular means, a grid or a so-called cage.

The at least one layer can be glued or welded to the support and/or a second layer.

Flocked materials and textile materials are also usable, in particular, as sound-absorbing materials for the sound-absorbing element.

Further advantages, features and possibilities of embodiment are evident from the following description of figures with respect to the associated drawings.

BRIEF DESCRIPTION OF THE DRAWINGS

The embodiments illustrated in the figures are not to scale and can, in the case of forms of embodiment to be implemented, differ from the illustration.

In the drawings.

DETAILED DESCRIPTION OF THE INVENTION

The same parts are provided in the figure description of FIGS. 1 to 8 with the same reference numerals insofar as they substantially correspond with one another in function and form thereof.

Figure 1:
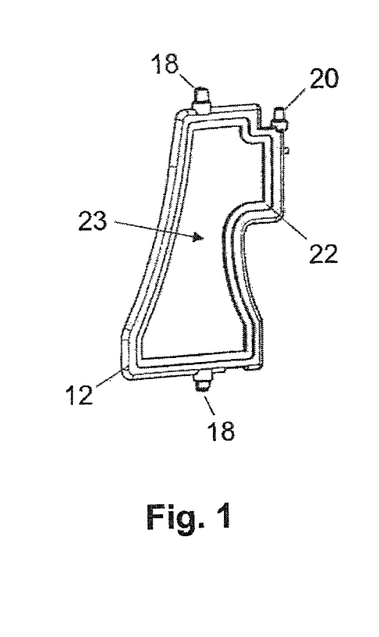
FIG. 1 shows a schematic view of a support for a sound-absorbing element in a first form of embodiment.

FIG. 1 shows a schematic view of a support 12 for a sound-absorbing element 10 in a first, not-claimed form of embodiment. The support 12 is constructed as a component of a vertical slat of an air vent 30 (not illustrated in FIG. 1). The support 12 has two bearing pins 18 by way of which the vertical slat or the support 12 is rotatably mounted in a housing 31 of the air vent 30. In addition, the support 12 has a pin 20, wherein a plurality of vertical slats or supports 12 are pivoted by way of their pins 20 and by way of a coupling rod interconnecting the pins 20. The support 12, which is constructed as a frame, has an inwardly disposed step 22 to which a layer 14 with sound-absorbing material is applied. The frame 12 preferably has a step of that kind on both sides so that a layer of sound-absorbing material can be applied to the support 12 at both sides and connected with the support 12. The region 23 surrounded by the step 22 and the support 12 constructed as a frame is left free so that depending on the thickness of the step 22 the layers 14 mounted on the two sides of the support 12 bear directly against one another or are arranged at a spacing from one another.

Figure 2:
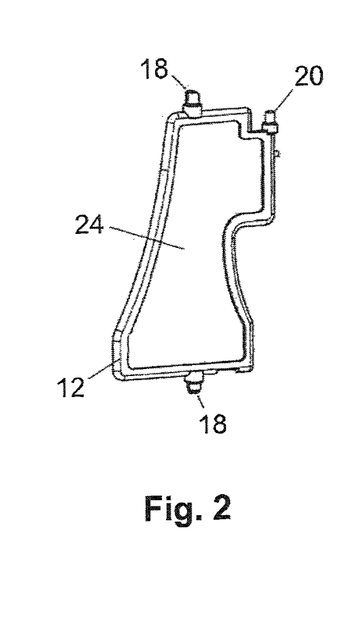
FIG. 2 shows a schematic view of a support for a sound-absorbing element in a second form of embodiment.

FIG. 2 shows a schematic view of a support 12 for a sound-absorbing element 10 of a second form of embodiment. The support 12 illustrated in FIG. 2 is constructed substantially as a component of a vertical slat for an air vent 30 (not illustrated in FIG. 2). The support 12 has two bearing pins 18 by way of which the support 12 or the vertical slat is rotatably mounted in a housing 31 of an air vent 30. In addition, the support 12 or the vertical slat has a pin 20, wherein a plurality of vertical slats or supports 12 is pivotable in common by way of a coupling rod connecting the pins 20 of the vertical slats. By contrast to the embodiment shown in FIG. 1, the support 12 of FIG. 2 does not have a free region 23, but has a seat 24 defining an area. A layer 14 of sound-absorbing material is applied to the areal seat 24. A layer 14 is preferably applied not only to the front side, which is illustrated in FIG. 2, of the seat 24, but also to the rear side of the seat 24. The encircling part of the support 12, which surrounds the seat 24, protrudes beyond the seat 24 by a defined amount which is selected, in particular, to be of such a size that a deposited layer 14 is aligned with the encircling part of the support 12.

Figure 3:
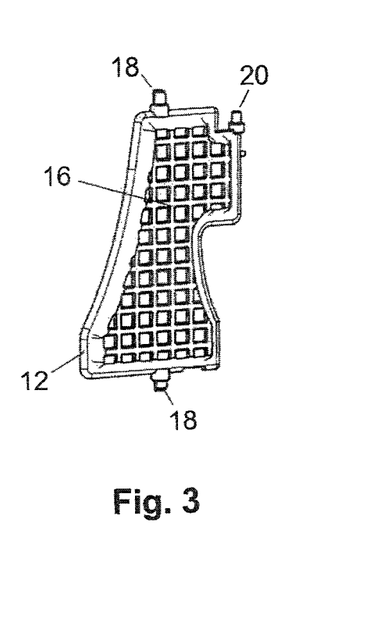
FIG. 3 shows a schematic view of a support for a sound-absorbing element in a third form of embodiment.

FIG. 3 shows a schematic view of a support 12 for a sound-absorbing element 10 in a third form of embodiment. The support 12 illustrated in FIG. 3 is also constructed as a vertical slat of an air vent 30. The support 12 has bearing pins 18 by way of which the support 12 or the vertical slat is rotatably mounted in a housing 31 of the air vent 30. In addition, the support 12 or the vertical slat has a pin 20, wherein a plurality of supports 12 or vertical slats is pivotable in common by way of a coupling rod interconnecting the pins 20 of the vertical slats. By contrast to the supports 12 shown in FIGS. 1 and 2 the support 12 of FIG. 3 is constructed so that it has a structure 16 in the region in which the layer 14 of sound-absorbing material is applied. The structure 16 can be of grid-shaped construction, as illustrated in FIG. 3. Such a structure has a plurality of strips extending horizontally and vertically or at right angles to one another, in which case passages are present between the strips. The structure 16 serves for, inter alia, weight reduction of the support 12. A layer 14 of sound-absorbing material can be applied to, in particular, the structure 16 on both sides of the support 12.

Figure 4:
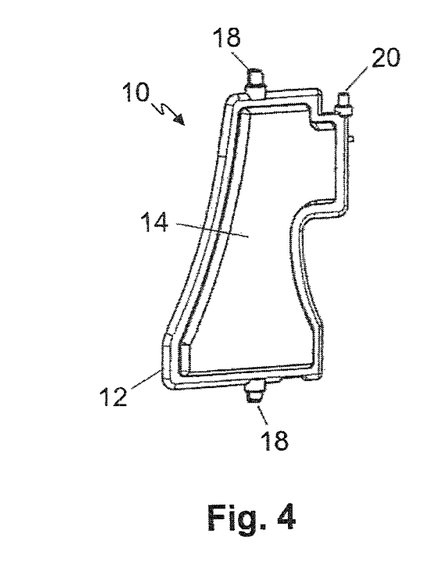
FIG. 4 shows a schematic view of a sound-absorbing element of the first form of embodiment.

FIG. 4 shows a schematic view of a sound-absorbing element 10 of the first form of embodiment. In distinction from the support 12 illustrated in FIG. 1, a layer 14 applied to the step 22 is also illustrated. The layer 14 is glued at the edge regions thereof onto the step 22, but a different connection is also possible. In particular, a layer 14 of sound-absorbing material is applied on either side of the support 12 to the step 22 and the opposite step (not illustrated in FIG. 4).

Figure 5:
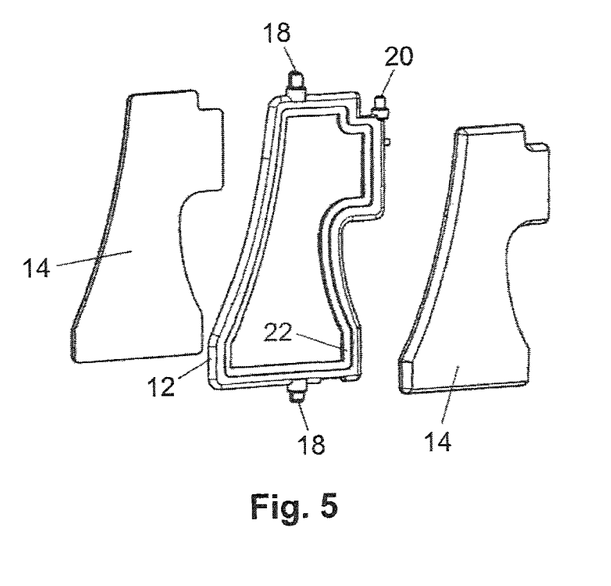
FIG. 5 shows an exploded drawing of a sound-absorbing element of the first form of embodiment in schematic view.

FIG. 5 shows an exploded drawing of a sound-absorbing element of the first form of embodiment in schematic view. The layers 14 have a defined thickness, wherein in the first form of embodiment the layers 14—in the state of connection with the support 12 constructed as a frame—protrude beyond the support 12 by a specific amount. The layers 14 consist of a sound-absorbing material. In particular, the sound-absorbing material of the layers 14 is a foamed material, the activated carbon particles being incorporated in or applied to the foamed material. The foamed material can also be completely coated with activated carbon so that the outwardly protruding surface of the layer 14 or of the layers 14 is covered with activated carbon. Moreover, by contrast to the illustration in FIGS. 4 and 5, the thickness of the layers 14 can vary. Thus, the layers 14, in air flow direction, can have a greater thickness towards an air outlet opening of the air vent 30 than in the section towards an air supply shaft 32 (not illustrated in FIGS. 4 and 5).

It is particularly advantageous if the surface of the layers 14 is of open-pore form. In the case of the embodiments illustrated in the figures the layers 14 each have a smooth surface. However, this is merely a consequence of the schematic illustration, there being no limitation to the illustrated embodiments.

An open-pore surface can be formed by regular or irregular structures. Moreover, patterns such as, for example, honeycombs or alternating depressions and elevations can be provided. Beyond that, in further forms of embodiment the layers 14 can be constructed so that the foamed material is of open-pore construction in such a way that an air flow through the material of the layers 14 is possible.

Figure 6:
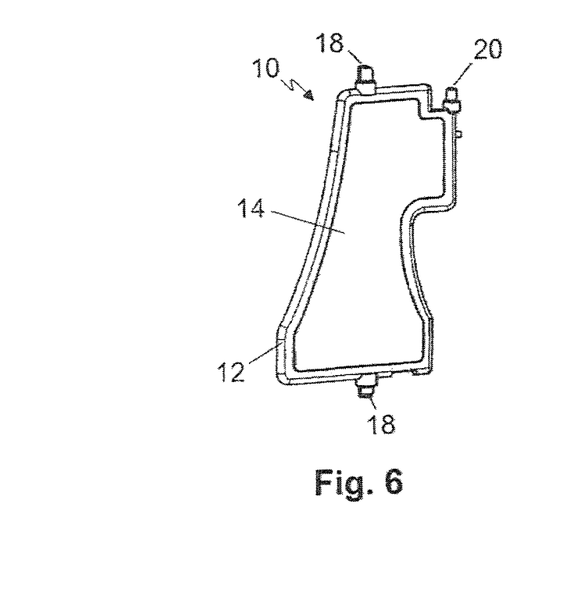
FIG. 6 shows a schematic view of a sound-absorbing element of the second form of embodiment.
Figure 7:
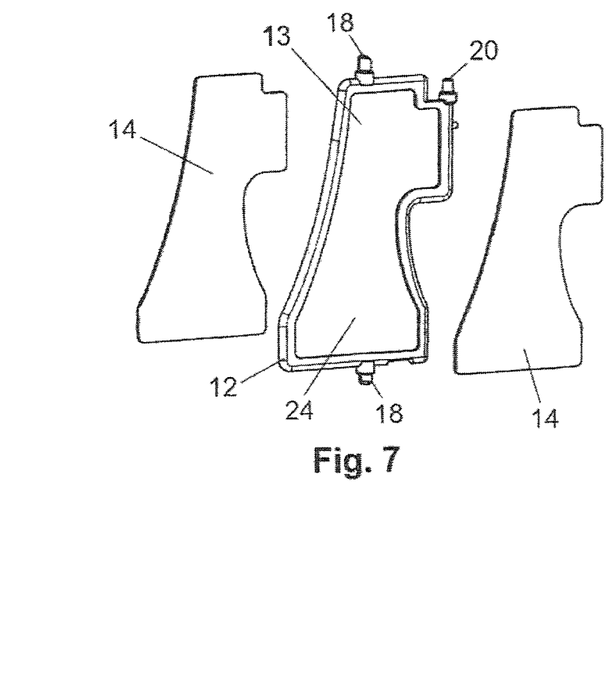
FIG. 7 shows an exploded drawing of a sound-absorbing element of the second form of embodiment in schematic view.

FIG. 6 shows a schematic view of a sound-absorbing element 10 of the second form of embodiment. In the case of the sound-absorbing element 10, which is illustrated in FIGS. 6 and 7, of the second form of embodiment (FIG. 2) in each instance a thin layer 14 is glued to the seat 24 on either side 13 of the support 12. The height by which the encircling part of the support 12 protrudes above the seat 24 is selected to be such that in the state of connection with the layers 14 of sound-absorbing material the surface of the layers 14 is aligned with the encircling region of the support 12. As already indicated for FIGS. 4 and 5, the layer 14 can consist of a foamed material and additionally comprise activated carbon. The activated carbon can be applied entirely to the layer 14 or be present as a constituent in the layer 14. Moreover, the layer 14 can also be formed entirely of activated carbon. For example, activated carbon particles are glued onto the seat 24 over the whole area. Noise reduction or elimination and air purification are thereby produced by the activated carbon.

FIG. 7 shows an exploded drawing of a sound-absorbing element 10 of the second form of embodiment in schematic view.

Figure 8:
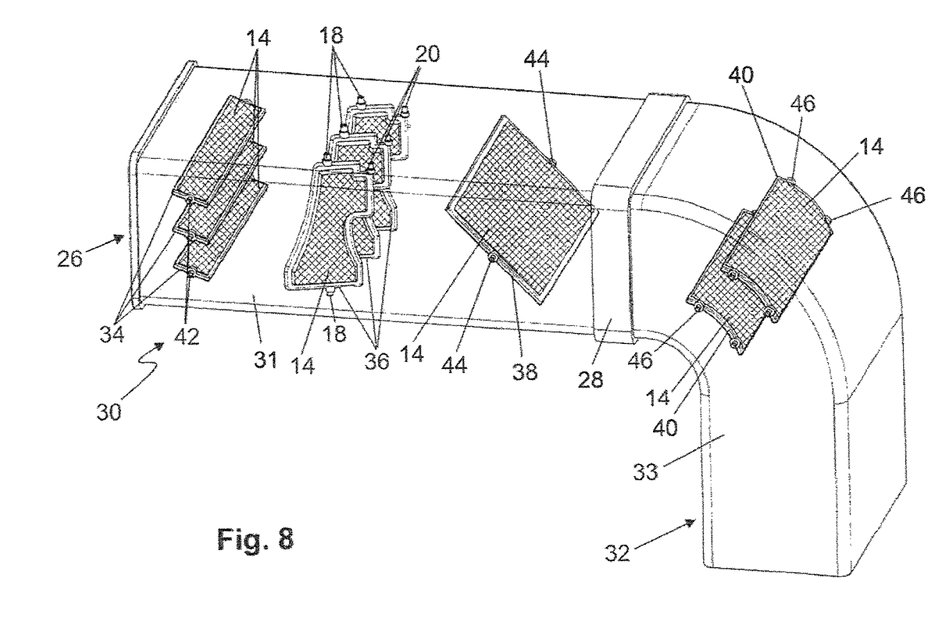
FIG. 8 shows a schematic view of an air vent and an air supply shaft with different sound-absorbing elements.

FIG. 8 shows a schematic view of an air vent 30 and an air supply shaft 32 with different sound-absorbing elements. The air vent 30 comprises a housing 31. The housing 31 of FIG. 8 is of substantially rectangular cross-section and has an air outlet opening 26. The air flowing out of the air outlet opening 26 is supplied by way of the air supply shaft 32, which similarly has a housing 33 and is connected with the air vent 30 by way of the connection 28 thereof.

The air fed through the air supply shaft 32 is deflected by way of air guide elements 40 and also flows along the surface of the air supply channel 32, wherein the air supply channel 32, through its curvature, also produces a deflection. A closure flap 38 serves the purpose of completely blocking the cross-section of the air vent 30, in which case depending on the setting of the closure flap 38 the quantity of outflowing air as well as the issue of air is set. Vertically extending slats 36 serve for deflecting the air around the pivot axes of the slats 36, which extend through the bearing pins 18 of the slats 36. Horizontally extending slats 34 serve for deflecting the air perpendicularly to the vertically extending slats 36. The horizontally extending slats 34 have bearing pins 42 by way of which the slats 34 are pivotally mounted in the housing 31 of the air vent 30. The slats 34 can be connected by way of coupling elements so that when pivotation of one slat 34 takes place the other slats 34 execute a corresponding movement.

The slats 36 are similarly rotatably mounted in the housing 31 of the air vent 30 by way of the bearing pins 18 and coupled together by way of a coupling rod and the pins 30 to be pivotable in common. The closure flap 38 is pivotably mounted in the housing 31 of the air vent 30 by way of the bearing pins 44 and can be pivoted by way of a device (not illustrated in FIG. 8).

The air guide elements 40 are mounted in the housing 33 of the air supply shaft 32 by way of bearing pins 46. By contrast to the other means (slats 34, slats 36 and closure flap 38), the air guide elements 40 cannot be pivoted.

In the example illustrated in FIG. 8 the slats 34, slats 36, closure flap 38 and air guide elements 40 each have layers 14 of sound-absorbing material. The layers 14 are in that case applied to both sides of the slats 34, slats 36, closure flap 38 and air guide elements 40. The embodiment shown here is only by way of example. Thus, the layers 14 can also be applied only to one group of slats 34 or 36 or the closure flap 38 or the air guide elements 40 or to several of the components listed above, but not all these components.

It is additionally possible to coat at least one wall of the housing 31 of the air vent 30 or of the housing 33 of the air supply shaft 32 with a layer 14 of sound-absorbing material. The layers 14 of sound-absorbing material comprise activated carbon or are completely coated with activated carbon or consist of activated carbon, so that on the one hand a reduction in and elimination of disturbing noise and on the other hand air purification of the outflowing air are achieved.

An air vent 30 of that kind and an air feed shaft 32 of that kind can, for example, be arranged in a motor vehicle. By comparison with known systems it is possible to dispense with filter devices, which need a large amount of installation space and produce purification of the air at a distance from the air outlet opening 36.

REFERENCE NUMERAL LIST 10 sound-absorbing element
12 support
13 side
14 layer
16 structure
18 bearing pin
20 pin
22 step
23 region
24 seat
26 air outlet opening
28 connection
30 air vent
31 housing
32 air feed shaft
33 housing
34 slat
36 slat
38 closure flap
40 air guide element
42 bearing pin
44 bearing pin
46 bearing pin

The invention claimed is:

1. A vehicle air vent, comprising a housing with an air outlet opening and a connection to an air supply shaft, said vehicle air vent including vertically extending slats and horizontally extending slats pivotally mounted within the housing, wherein at least one sound-absorbing element is mounted in the housing or a housing of the air supply shaft and wherein the sound-absorbing element comprises a support which is connected with at least one layer of sound-absorbing material, wherein the at least one layer of sound-absorbing material comprises activated carbon ort at least one further layer of activated carbon is applied to the layer of sound-absorbing material, wherein the at least one layer is applied over an area to at least one side of the support, wherein the support has at least one seat in which the layer is so received that the layer is aligned with the region of the support surrounding the seat, and that the sound-absorbing element is a slat of an air vent, a closure flap of an air vent, an air guide element of an air supply shaft or at least a part of the housing of the air vent of the air supply shaft.

2. The vehicle air vent according to claim 1, wherein a layer is applied to both sides of the support.

3. The vehicle air vent according to claim 1, wherein
the at least one layer comprises a foamed material, wherein activated carbon is incorporated in the foamed material or the foamed material is coated with activated carbon and the foamed material is of open-pore construction, or
the at least one layer consists entirely of activated carbon.

4. The vehicle air vent according to claim 2, wherein
the at least one layer comprises a foamed material, wherein activated carbon is incorporated in the foamed material or the foamed material is coated with activated carbon and the foamed material is of open-pore construction, or
the at least one layer consists entirely of activated carbon.

5. The vehicle air vent according to claim 1, wherein the support has passages, openings or a support structure in the region of the at least one layer.

6. The vehicle air vent according to claim 4, wherein the support has passages, openings or a support structure in the region of the at least one layer.

7. The vehicle air vent according to claim 1, wherein
the at least one layer has an open-pore surface or,
the surface of the at least one layer has a regular or irregular surface structure or,
the at least one layer is thermally deformed or,
the at least one layer is glued or welded to the support or to a second layer.

8. The vehicle air vent according to claim 2, wherein
the at least one layer has an open-pore surface or,
the surface of the at least one layer has a regular or irregular surface structure or,
the at least one layer is thermally deformed or,
the at least one layer is glued or welded to the support or to a second layer.

9. The vehicle air vent according to claim 3, wherein
the at least one layer has an open-pore surface or,
the surface of the at least one layer has a regular or irregular surface structure or,
the at least one layer is thermally deformed or,
the at least one layer is glued or welded to the support or to a second layer.

10. The vehicle air vent according to claim 4, wherein
the at least one layer has an open-pore surface or,
the surface of the at least one layer has a regular or irregular surface structure or,
the at least one layer is thermally deformed or,
the at least one layer is glued or welded to the support or to a second layer.

11. The vehicle air vent according to claim 6, wherein
the at least one layer has an open-pore surface or,
the surface of the at least one layer has a regular or irregular surface structure or,
the at least one layer is thermally deformed or,
the at least one layer is glued or welded to the support or to a second layer.

12. The vehicle air vent according to claim 1, wherein the at least one layer is so constructed that in air flow direction it has a greater thickness towards the air outlet opening than the section towards the air supply shaft.

13. The vehicle air vent according to claim 2, wherein the at least one layer is so constructed that in air flow direction it has a greater thickness towards the air outlet opening than the section towards the air supply shaft.

14. The vehicle air vent according to claim 3, wherein the at least one layer is so constructed that in air flow direction it has a greater thickness towards the air outlet opening than the section towards the air supply shaft.

15. The vehicle air vent according to claim 4, wherein the at least one layer is so constructed that in air flow direction it has a greater thickness towards the air outlet opening than the section towards the air supply shaft.

16. The vehicle air vent according to claim 5, wherein the at least one layer is so constructed that in air flow direction it has a greater thickness towards the air outlet opening than the section towards the air supply shaft.

17. The vehicle air vent according to claim 6, wherein the at least one layer is so constructed that in air flow direction it has a greater thickness towards the air outlet opening than the section towards the air supply shaft.

18. The vehicle air vent according to claim 7, wherein the at least one layer is so constructed that in air flow direction it has a greater thickness towards the air outlet opening than the section towards the air supply shaft.

19. The vehicle air vent according to claim 1, wherein the further layer is received in a support frame and the support frame is connected with the support.

20. The vehicle air vent according to claim 1, wherein the vertically extending slats and the horizontally extending slats are coupled so that all the vertically extending slats or the horizontally extending slats, as the case may be, move together.

* * * * *